Nov. 25, 1930.    C. C. FARMER    1,782,567
GASKET
Filed July 7, 1925
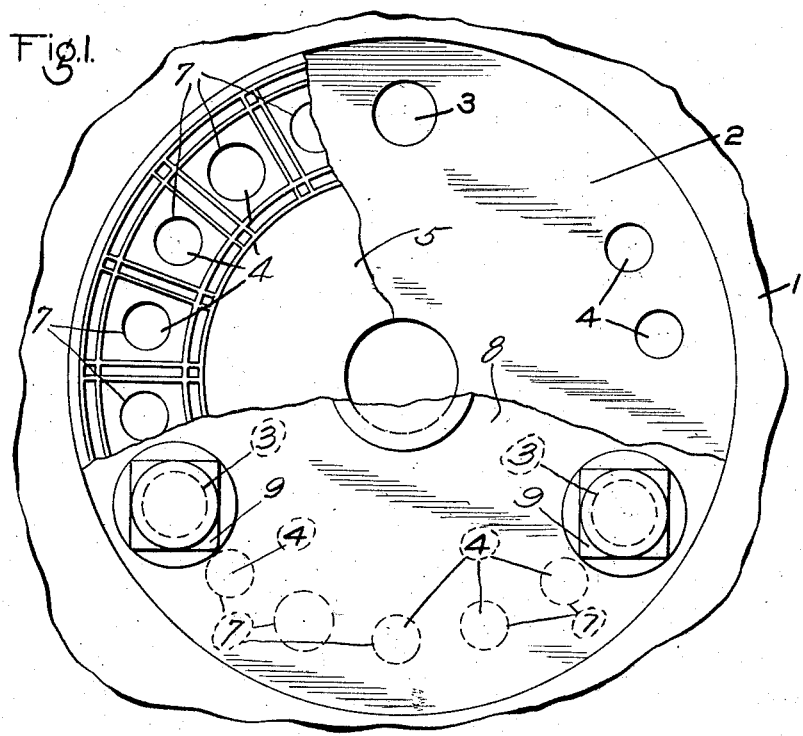
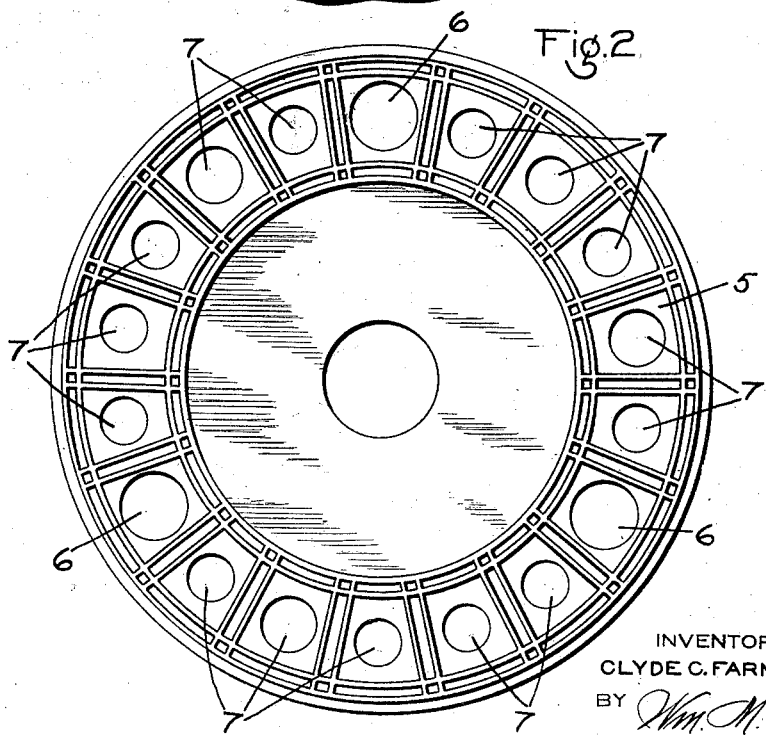
INVENTOR
CLYDE C. FARMER
BY Wm. M. Cady
ATTORNEY Patented Nov. 25, 1930

1,782,567

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

GASKET

Application filed July 7, 1925. Serial No. 42,011.

This invention relates to gaskets, and more particularly to a gasket adapted to make a tight joint between two members having a plurality of connecting openings for the passage of fluid under pressure.

With a gasket of the above character, openings are also provided for bolts employed in securing the members together, and it has heretofore been necessary to apply the gasket in a position such that the fluid pressure openings in the gasket will register with the corresponding openings in the connected members. If the gasket is not so applied, then the openings in the gasket may not register with the corresponding openings in said members, with the result that the passages may be blanked.

The principal object of my invention is to provide a gasket which may be applied in any position in which the bolt openings register with the securing bolts and yet ensure that all of the fluid pressure openings will register properly.

In the accompanying drawing; Fig. 1 is a face view of a member having a gasket face provided with openings, a gasket applied thereto and constructed in accordance with my invention, and a cover plate clamping the gasket to said member; and Fig. 2 a plan view of a gasket adapted to be applied to the gasket face shown in Fig. 1 and constructed in accordance with my invention.

The member 1 shown in Fig. 1 is provided with a gasket face 2 having a plurality of openings arranged with their centers on a circle. The openings 3 are bolt openings and are three in number, arranged symmetrically, and openings 4 are provided for the passage of fluid under pressure and may be located unsymmetrically, as shown.

The gasket 5, as shown in Fig. 2, is provided with bolt openings 6, arranged symmetrically and adapted to register with the bolt openings 3 in the gasket face 2, and said gasket is adapted to be clamped between the member 1 and a cover plate 8 by means of bolts 9. It will be seen that when the gasket is applied to the gasket face and any one of the bolt openings 6 of the gasket 5 is in registry with one of the bolt openings 3, the other bolt openings 6 will also register with the remaining bolt openings 3 in the gasket face.

Instead of providing only sufficient openings in the gasket 5 to correspond with the fluid pressure openings 4 in the gasket face, openings 7 are provided, which are symmetrically spaced between the bolt openings 6, so that when the gasket 5 is applied to the gasket face 2 of the member 1, there will always be openings 7 which will register with the unsymmetrically disposed openings 4, so long as the gasket is applied with the bolt openings 6 in registry with the bolt openings 3 in the gasket face.

It will be noted that the bolt openings 6 are of larger diameter than the openings 7, so that connecting bolts of the same diameter can only enter the bolt openings 6 and this prevents applying the gasket except with the bolt openings 6 registering with the bolt openings 3, and on the other hand, there will always be openings 7 in registry with the openings 4, regardless of which bolt opening 6 happens to register with a particular bolt opening 3 in the gasket face.

It will now be evident that by constructing the gasket in accordance with my invention, it is impossible to apply the gasket in such a manner as to block or cut off any of the fluid pressure openings in the gasket face.

Having now described my invention, what I claim as new and desire to secure by Letters Patent, is:

1. The combination with a member having a gasket face provided with openings having their centers on the same circle, some of the openings being symmetrically disposed bolt openings and the other openings being unsymmetrically disposed fluid pressure openings, and a cover plate of a gasket interposed between said member and said plate and having symmetrically disposed bolt openings adapted to register with the bolt openings in the gasket face and symmetrically disposed openings, some of which will register with the unsymmetrically disposed fluid pressure openings in the gasket face, whenever the bolt openings in the gasket register with the bolt openings in said member.

2. The combination with a member having a gasket face provided with openings having their centers on the same circle, some of the openings being equally spaced bolt openings and the other openings being unequally spaced fluid pressure openings, and a cover plate of a gasket interposed between said member and said plate and having bolt openings equally spaced to correspond with the bolt openings in the gasket face and equally spaced fluid pressure openings, some of which will register with the unequally spaced fluid pressure openings in the gasket face in any position in which the gasket may be applied with the bolt openings of the gasket in registry with the bolt openings in the gasket face, the bolt openings being of greater diameter than the fluid pressure openings to receive bolts of a corresponding diameter.

In testimony whereof I have hereunto set my hand.

CLYDE C. FARMER.